United States Patent [19]
Jenkins et al.

[11] Patent Number: 5,684,820
[45] Date of Patent: Nov. 4, 1997

[54] WAVEGUIDE LASER

[75] Inventors: Richard M. Jenkins; Christopher A. Hill, both of Malvern, Great Britain

[73] Assignee: The Secretary of State for Defence in Her Britannic Majesty's Government of the United Kingdom of Great Britain and Northern Ireland of Defence and Evaluation Research Agency, Hants, Great Britain

[21] Appl. No.: 545,732

[22] PCT Filed: Apr. 8, 1994

[86] PCT No.: PCT/GB94/00748

§ 371 Date: Nov. 21, 1995

§ 102(e) Date: Nov. 21, 1995

[87] PCT Pub. No.: WO94/27346

PCT Pub. Date: Nov. 24, 1994

[30] Foreign Application Priority Data

May 7, 1993 [GB] United Kingdom .................... 9309467

[51] Int. Cl.[6] ...................................................... H01S 3/03
[52] U.S. Cl. .............................. 372/64; 372/103; 372/98; 372/92; 372/19
[58] Field of Search ............................. 372/64, 92, 102, 372/108, 99, 19, 103, 9, 98

[56] References Cited

U.S. PATENT DOCUMENTS

| | | | |
|---|---|---|---|
| 3,852,684 | 12/1974 | Roess et al. | 372/99 |
| 3,961,283 | 6/1976 | Abrams et al. | 372/64 |
| 4,287,482 | 9/1981 | Wert, III | 372/19 |
| 4,884,282 | 11/1989 | Bridges | 372/64 |
| 5,048,047 | 9/1991 | Kozlovsky et al. | 372/92 |
| 5,151,917 | 9/1992 | Perilloux et al. | 372/99 |

FOREIGN PATENT DOCUMENTS

| | | |
|---|---|---|
| 0 466 104 | 1/1992 | European Pat. Off. . |
| WO 93/01635 | 1/1993 | WIPO . |

OTHER PUBLICATIONS

Roullard, III et al., "Transverse Mode Control in High Gain, Millimeter Bore, Waveguide Lasers;" IEEE Journal of Quantum Electronics, vol. QE–13, No. 10, Oct. 1977; pp. 813–818.

Roulnois et al.; "Mode Discrimination and Coupling Losses in Rectangular–Waveguide Resonators with Conventional and Phase–Conjugate Mirrors;" J. Opt. Soc. Am., vol. 72, No. 7, Jul. 1982; pp. 853–860.

Chirikov et al.; "Formation Details of a Waveguide Gas Laser Intensity Distribution;" Infrared Phys., vol. 30, No. 6, 1990, pp. 455–464.

*Primary Examiner*—Leon Scott, Jr.
*Attorney, Agent, or Firm*—Nixon & Vanderhye P.C.

[57] ABSTRACT

A waveguide laser (10) incorporates a guide (12) and two concave resonator mirrors (14, 16). The guide (12) is of square section with side (2a), and of length L equal to $4a^2/\lambda$, where $\lambda$ is a laser operating wavelength. The mirrors (14, 16) are phase matched to respective Gaussian intensity profile radiation beams with beam waists at respective waveguide end apertures (20, 22). Each beam waist has a radius $w_0$ in the range 0.1a to 0.65a to avoid waveguide edge effects and excitation of unwanted high order waveguide modes. The laser (10) has good transverse spatial mode characteristics.

19 Claims, 5 Drawing Sheets

WAVEGUIDE LASER

BACKGROUND OF THE INVENTION

1. Field of the Invention

This invention relates to a waveguide laser.

2. Discussion of Prior Art

Waveguide lasers are known in the part art. Such as laser typically consists of two mirrors (or equivalent reflecting devices) defining an optical resonator cavity, together with a waveguide defining at least part of an optical path between the reflectors. The waveguide has end apertures at or near which the reflectors are positioned respectively. The reflectors' radii of curvature and their positioning relative to the waveguide are related by the following Equations (1) and (2):

$$R = z_m + B^2/z_m \quad (1)$$

$$w = w_0[1 + (z^2/B^2)]^{1/2} \quad (2)$$

where:

R is the radius of curvature of the respective mirror in each case, z is a position coordinate measured along the laser beam from each mirror to the respective nearest waveguide end aperture, $z_m$ is the value of z at the respective mirror, B is the confocal beam parameter equal to $\pi w_0^2/\lambda$, w is the beam radius at position z, and is measured between positions at which beam intensity is maximum and $1/e^2$ of maximum, $w_0$ is the beam waist radius of a $TEM_{00}$ intensity profile laser beam measured at the respective neighbouring waveguide and aperture, and $\lambda$ is the wavelength of laser radiation measured in the respective region between mirror and waveguide.

Equations (1) and (2) define a situation in which a mirror of radius R is phase matched to a $TEM_{00}$ beam. Waveguide laser resonators have associated mirror configurations referred to in the prior art as Case I, Case II and Case III. They are defined with reference to Equations (1) and (2) above. They are described by J. J. Degnan and D. R. Hall, III, J Quantum Electron, Vol QE-9, pp 901–910, 1973. They are also referred to in "Theory of Waveguide Laser Resonators", Chapter 3 of "The physics and Technology of Laser Resonators", edited by D. R. Hall and P. E. Jackson, published by Adam Hilger. A Case I mirror has a large radius of curvature R (possibly infinite, ie a plane mirror) and a small or zero value of z; ie R tend to $B^2/z$ in Equation (1) as z goes to zero. A Case II reflector has a large radius of curvature and is positioned such that z is approximately equal to R, $B^2/z$ being negligible. Finally, a Case III reflector is one with z equal to about half the value of R, z being approximately equal to B and $w_0$ being chosen to provide optimum coupling to the $EH_{11}$ fundamental waveguide mode.

Waveguide lasers incorporating gas media are advantageous because the waveguide provides cooling for the discharge. As a result of gas discharge scaling laws, the waveguide also allows high pressure operation. Moreover, $CO_2$ lasers in particular have a laser line width that increases with increased operating pressure, so incorporation of a waveguide improved potential tuning range. This also applies to other gas lasers in which laser line width increases with increasing pressure. A further potential advantage is that the gain medium of a waveguide laser may be confined to a small dimension optical waveguide, which makes it very compact compared with a free space resonator. Moreover, the resonator mode may effectively fill the waveguide, producing good overlap between the optical field and the gain medium. This results in efficient extraction of optical power. It is not necessarily the case in free space resonator designs.

However, waveguide lasers suffer from the disadvantage that the waveguides are difficult to fabricate with sufficient accuracy to obtain acceptable laser performance. A typical $CO_2$ laser has an alumina ($Al_2O_3$) waveguide in the region of 30 cm in length with an internal bore of square cross-section of side 2 mm. It is very difficult to fabricate an internal bore of these small dimensions accurately over the whole length of the waveguide. Uncertainty of cross-section leads to uncertainty of laser transverse mode characteristics. Waveguide lasers also suffer from the major disadvantage that they tend to run on unwanted higher order waveguide resonator modes rather than the fundamental resonator mode (usually near $TEM_{00}$). This is particularly true for Case I designs. Case III is better in this respect, but it has an added disadvantage that it requires a concave mirror placed a much longer distance from the waveguide. Consequently, there is reduced effective power output per unit length of the laser compared to Case I.

In "Radio Frequency Excited $CO_2$ Waveguide Lasers", Rev Sci Instrum 55 (1984), pp 1539–1541, R. L. Sinclair and J. Tulip described waveguide resonators based on square cross-section waveguides with two approximately Case I reflectors. The waveguide consists of two sections each 29.5 cm long with cross-sections of either 2.0 mm or 2.5 mm side. The waveguides are defined by walls, these being formed of aluminium on one side and alumina on the remaining three sides. The reflectors are each zinc selenide coated and positioned 2.0 mm from the waveguide apertures. This laser suffers from relatively poor transverse mode discrimination, and the mode quality of the laser output is easily degraded by perturbations in the laser discharge or in the laser optics.

A different form of waveguide laser is described by J-L. Boulnois and G. P. Agrawal in "Mode Discrimination and Coupling Losses in Rectangular-Waveguide Resonators with Conventional and Phase-Conjugate Mirrors", J Opt Soc Am 72 (1982), pp 853–860. This incorporated an alumina waveguide of length 200 mm and square section with side 2 mm. Curved mirrors each with radius of curvature R equal to 1000 mm were positioned 21 mm from respective end apertures of the waveguide. The mirrors did not conform to Case I, II or III. They were phase matched to a free space $TEM_{00}$ mode within the laser resonator cavity but outside the waveguide. Phase matching maximised the excitation of the waveguide fundamental mode $EH_{11}$ and ensured the highest possible efficiency of radiation intensity coupling between the $TEM_{00}$ free space mode and the $EH_{11}$ waveguide mode. This type of laser is intolerant to waveguide manufacturing errors because its design ignores multimode coupling and propagation effects.

S. N. Chirikov, S. T. Kornilov, E. D. Protsenko and M. I. Pschikov in "Formation Details of a Waveguide Gas Laser Intensity Distribution", Infrared Phys. 30, (1990), pp 455–464, describe a laser resonator with a square section waveguide and two distant plane mirrors. For the purposes of studying the mode phase shifts, the mirrors were however treated as equivalent to Case I. The authors investigated the effect on the resonator output of altering the length of the waveguide. In particular they studied the contribution of different waveguide modes to the resonator modes, and the losses of the resonator modes, as the waveguide length changed. The results showed that certain laser properties such as sensitivity to mirror misalignment depend on waveguide Fresnel number N; N is defined as $a^2/\lambda L$, where a is waveguide half-width, L is waveguide length and $\lambda$ is radiation wavelength. Similar results were obtained by C. A. Hill, P. Monk and D. R. Hall, IEEE J. Quantum Electron, Vol. QE-23 pp 1968–1973, 1987.

C. A. Hill in "Transverse Modes of Plane-Mirror Waveguide Resonators", IEEE J Quantum Electron. QE-24, (1988), pp 1936–1946, discusses the theory of square section waveguides with plane mirrors. It is shown that it is difficult in this kind of laser to combine low loss with good mode discrimination without sensitivity to waveguide manufacturing errors.

It is also known to employ lasers with circular bore waveguides. These are described by F. P. Roullard III and M. Bass, IEEE Quantum Electron, Vol. QE-13, pp 3684–3690, 1977, and by M. Lyszyk et al, Opt. Commun, Vol. 36, pp 327–330, 1981. Generally, circular bore waveguide lasers suffer from the disadvantage that laser output mode properties are not sufficiently good for high performance applications. Furthermore, circular bore waveguides are much more difficult to manufacture accurately compared to waveguides with planar parallel walls.

It is a very important requirement of many lasers that they produce an output beam directed along the laser axis with a high on-axis intensity in the fare filed. This means that the output should be a fundamental spatial mode having a single lobe of $TEM_{00}$ intensity profile centred on the laser axis. It is in general difficult to achieve this reliably. Lasers may produce two or more output modes, which may be at different frequencies. They may also produce output modes with off-axis beam lobes. Moreover, apparently identical lasers may produce different outputs, and a single laser may change abruptly from single lobe to multi-lobe during warm-up or because of change in ambient conditions. A multi-lobe pattern is not useful for most purposes, in that most optical systems involving lasers are designed for the laser beams are potentially hazardous, in that radiation is directed in non-design directions possibly out of the optical system.

SUMMARY OF THE INVENTION

It is an object of the invention to provide an alternative form of waveguide laser.

The present invention provides a waveguide laser including a waveguide located in a laser resonator cavity defined by first and second reflecting means, and wherein:

(a) the waveguide has at least one pair of substantially planar guide walls which are substantially parallel to one another and separated from one another by a distance 2a;

(b) the cavity is designed to provide a beam waist of magnitude $2w_0$ located centrally of a waveguide end apertures, where $w_0$ is in the range 0.1a to 0.65a;

(c) the first reflection means is located to receive radiation emergent from the waveguide through the end aperture, and has converging and reflecting properties which, at least in a dimension orthogonal to the guide walls, are arranged to be phase matched to radiation received from an amplitude distribution at the aperture of $TEM_{00}$ form having the said beam waist magnitude; and (d) the cavity is designed to be electric field preserving at the waveguide end aperture such that a radiation amplitude distribution at this aperture of $TEM_{00}$ form and having the said beam waist magnitude is designed to be recreated after radiation therefrom has passed through the waveguide to the second reflecting means and returned.

The invention provides the advantage that it is capable of providing an output beam which has higher $TEM_{00}$ mode content in the fundamental mode than the prior art. It is also in particular embodiments capable of exhibiting greater insensitivity to manufacturing errors. It also provides the advantage that undesirable waveguide input edge effects are avoided and so also is disproportionate attenuation of high order modes.

In a preferred embodiment, the beam waist radius $w_0$ is in the range 0.3a to 0.65a; the laser has a gain medium within the waveguide providing gain at an operating wavelength within the waveguide of $\lambda$, and the waveguide is of square cross-section with side 2a and length $4na^2/\lambda$ where n is a positive integer, the aperture is a first end aperture and the waveguide has a second end aperture at which the cavity is arranged to be electric field preserving.

The waveguide may be a first waveguide and the laser may include a second waveguide within the cavity. The laser may include means for coupling radiation from the first waveguide to the second waveguide, which means may define mutually inclined optical paths in the first and second waveguides.

The laser may alternatively include second reflecting means comprising a plane mirror; the waveguide may be of square cross-section with side 2a and length $2 a^2/\lambda$, the aperture may be a first end aperture and the waveguide may have a second end aperture arranged immediately adjacent the second reflecting means.

In a further embodiment of the laser of the invention:

(a) the waveguide is a first waveguide, (b) the aperture is one of two end apertures of the first waveguide, (c) a second waveguide having two end apertures is arranged within the cavity, (d) the laser includes means for coupling radiation between one end aperture of the first waveguide and one end aperture of the second waveguide, (e) both waveguides are of square cross-section with side 2a and length $4a^2/\lambda$, and (f) the cavity is arranged to be electric field preserving at the other end aperture of the second waveguide.

In this further embodiment, the means for coupling radiation may define mutually inclined optical paths in the first and second waveguides.

BRIEF DESCRIPTION OF THE DRAWINGS

In order that the invention might be more fully understood, embodiments thereof will now be described, with reference to the accompany drawings, in which.

DETAILED DESCRIPTION OF PREFERRED EMBODIMENTS

Figure 1:
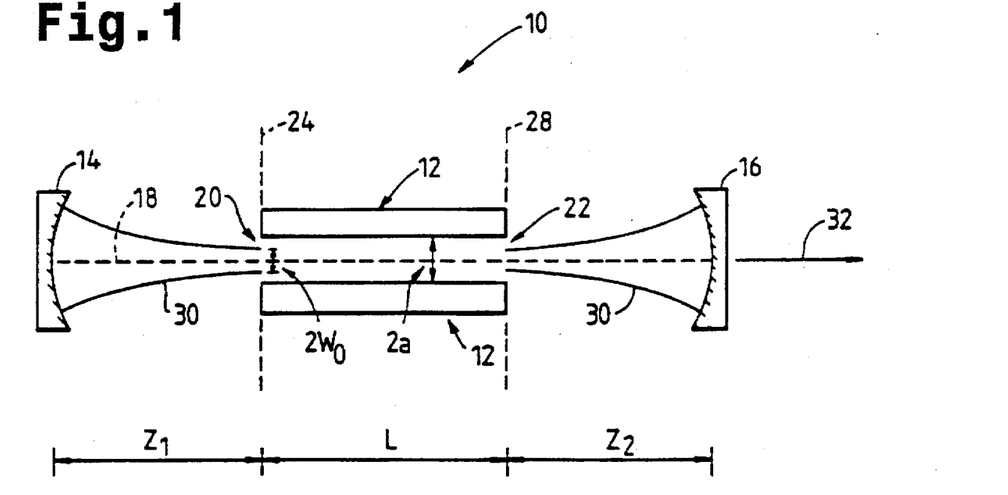
FIG. 1 is a schematic sectional side view of a waveguide laser of the invention incorporating two like concave resonator mirrors.

Referring to FIG. 1, there is shown a sectional side view of a waveguide laser of the invention indicated generally by 10. The laser 10 is not drawn to scale. It incorporates an optical waveguide 12 (hereinafter referred to as a "guide") positioned between first and second converging mirrors 14 and 16. The mirrors 14 and 16 are fully reflecting and partially reflecting respectively. The guide 12 and mirrors 14 and 16 have a common optical axis 18, which is in the plane of the drawing.

The guide 12 is a hollow alumina tube with square cross-section of side 2a equal to 2 mm. It is of length L given by:

$$L = 4a^2/\lambda \tag{3}$$

where $\lambda$ is the laser operating wavelength measured within the guide 12.

The laser 10 is designed for operation at a free space wavelength of $10.59 \times 10^{-4}$ cm. The refractive index of the $CO_2$ medium within the guide 12 is substantially equal to unity, and the wavelength $\lambda$ in the guide is therefore equal to its free space value. As calculated from Equation (3), L is 37.8 cm.

The mirrors 14 and 16 have respective radii of curvature $R_1$ and $R_2$ both equal to 29 cm in this example. They are spaced apart from respective guide end apertures 20 and 22 by respective distances $z_1$ and $z_2$. In the present example, $z_1$ and $z_2$ are both equal to 4.7 cm. The laser 10 is designed to produce radiation of $TEM_{00}$ intensity profile in planes orthogonal to the axis 18, and defined by:

$$I_r(z) = I_0(z) e^{-2r^2/w^2} \tag{4}$$

where:

$I_r(z)$ is the radiation intensity in any plane between a mirror 14 or 16 and the waveguide 12 distant z along the axis 18 from the waveguide, $I_0(z)$ is the radiation intensity measured at the point z on the axis 18, r is the radial distance from the axis 18 of the point at which $I_r(z)$ is determined, and w is the laser beam radius at the axial position z, and is defined as the value of r at which $I_r(z)/I_0(z)$ is $e^{-2}$; it is a function of distance between the guide 12 and mirror 14 or 16.

The laser is designed to produce two minimum beam widths (referred to as beam waists) of design radius $w_0$ (diameter $2w_0$) at and concentric with first and second guide end apertures 20 and 22 respectively. These apertures lie in planes 24 and 28 indicated by chain lines 24 and 28 and extending perpendicular to the plane of the drawing. The design beam waist diameter $2w_0$ is related to mirror radius of curvature and mirror-guide spacing by Equation (1) repeated below for convenience:

$$R = z + B^2/z, \text{ where } B = \pi w_0^2/\lambda \tag{1}$$

$R = R_1 = R_2$ in the FIG. 1 example.
Eliminating B:

$$R = z + \frac{\pi^2 w_0^4}{z \lambda^2} \tag{5}$$

Substituting for R, z and $\lambda$ in Equation (5) gives:

$$w_0 = 0.6 \text{ mm} \tag{6}$$

The laser 10 consequently is designed to produce radiation 30 with a design beam waist radius of 0.6 mm (diameter $2w_0$ of 1.2 mm) in the planes 24 and 28. The ratio $w_0/a$ of design beam waist diameter to waveguide diameter is 0.6; ie $w_0$ is equal to 0.6 z.

The radius of curvature R of each mirror 14 or 16 is chosen so that it is accurately phase-matched to a conceptual spherical wavefront which would be produced at that mirror by a $TEM_{00}$ intensity profile planar wavefront located in a respective plane 24 or 28 and centred on an end aperture 20 or 22. To a first order approximation a $TEM_{00}$ Gaussian wavefront at a guide aperture 20 or 22 produces a substantially spherical wavefront at a mirror 14 or 16. Each mirror consequently produces retroreflection of incident radiation across the incident wavefront in each case. On receipt of such a spherical wavefront, each mirror 14 or 16 therefore returns to the respective guide aperture 20 or 22 a substantially fully phase-reversed beam which recreates the planar $TEM_{00}$ wavefront at that aperture. As has been said, the second mirror 16 is partially reflecting, and transmission through it gives rise to an output beam 32.

The distance z of each mirror 14 or 16 from the respective guide aperture 20 or 22 is chosen to provide significant diffraction and consequent laser beam divergence between the relevant aperture and mirror in each case. Such diffraction is in part responsible for advantageous mode selection properties, involving preferential recreation of a $TEM_{00}$ mode leaving an aperture 20 or 22 and returning to it from a mirror 14 or 16. The relevant $TEM_{00}$ mode is that having the design beam waist $w_0$ for which the mirrors are selected in accordance with Equation (1). Modes with beam waists not equal to $w_0$ are less accurately recreated on return after reflection from a mirror 14 or 16, which normally results in higher loss for the associated resonator mode. In accordance with the invention, R must be not greater than 5B and not less than 2B, where B is the confocal beam parameter in Equation (1). This produces acceptable diffraction properties as aforesaid combined with reasonable compactness of the laser. Lasers of the invention therefore lie outside both Case I (R>>B, z<<B) and Case II (Z and R both >>B).

As will be described later in more detail, the guide 12 is designed to reproduce at one aperture 20 or 22 any electric field amplitude distribution input to the other guide aperture 22 or 20, provided that the input distribution excites only symmetric modes of the guide. An on-axis, in phase, plane wave excites only symmetric modes. In consequence, as regards the form of the fundamental resonator mode (although not in other respects), the laser resonator device 10 behaves substantially as through the guide 12 were removed and the mirrors 14 and 16 were moved together until the planes 24 and 28 were coincident. Moreover, the mirrors 14 and 16 have radii of curvature and positioning designed to provide for a TEM$_{00}$ intensity profile radiation beam with a beam waist at an aperture 20 or 22 to be returned to that aperture by the respective mirror 14 and 16 with unchanged relative transverse phase and amplitude profiles. This is achieved by providing for mirror radii R$_1$ and R$_2$ in each case to satisfy Equation (1) and for the mirrors 14 and 16 to have centres of curvature (not shown) which are on the guide axis 18; ie the guide 12 and mirrors 14 and 16 form a well-aligned coaxial system. Equation (1) determines the design beam waist radius w$_0$ for given values of R, z and λ.

The net effect of the positioning and dimensions of the guide 12 and mirrors 14 and 16 is that the laser 10 has comparatively low loss for a TEM$_{00}$ beam with the selected laser beam waist, but comparatively high loss otherwise. When a CO$_2$ laser medium within the guide 12 is excited, the resonator mode having the highest ratio of gain to loss is the laser mode that is generated. Other laser spatial modes of higher gain/loss ratio are suppressed. A laser of the invention has a lowest loss mode which is the fundamental quasi-TEM$_{00}$ mode.

It has been found that it is advantageous to avoid very high order spatial modes of propagation in the guide 12 and also to avoid edge effects at the guide apertures 20 and 22. To achieve this, the radiation intensity at the edges of the apertures 20 and 22 should be less than 1% of maximum intensity on the axis 18 at each beam waist. This sets an upper limit on the ratio of beam waist to aperture size, is w$_0$/a, of 0.65. Such an upper limit provides for input radiation intensity of a TEM$_{00}$ beam at aperture edges to be less than 1% of the maximum on-axis beam intensity.

If the ratio w$_0$/a is greater than or equal to 0.1, but not greater than 0.65, there will be insignificant excitation of very high order spatial modes within the guide 12; ie guide modes EH$_{mn}$ with m and n equal to 11 or more will not be excited to any appreciable extent. If w$_0$/a is greater than or equal to 0.3, but not greater than 0.65, then guide modes above EH$_{77}$ will have intensities less than 0.5% of the total radiation intensity. It is advantageous to avoid significant excitation of very high order guide modes, because they suffer from disproportionately large attenuation in propagation along the guide 12. They interact more strongly with guide walls than lower order modes. This introduces phase errors which degrade electric field regeneration. In consequence, such very high order modes are not available in the correct relative proportions for reproduction at an output aperture 20 or 22 of an electric field distribution initially input at aperture 22 or 20 respectively. The ratio w$_0$/a of the input radiation beam waist to the input aperture size should therefore be appropriate to discriminate against excitation of very high order modes (m, n>11); w$_0$/a should therefore be in the range 0.1 to 0.65, and preferably in the range 0.3 to 0.65 for modes above EH$_{77}$ to receive less than 1% of total radiation intensity. Devices of the invention may conveniently have w$_0$/a in the range 0.4 to 0.55.

In the device 10, w$_0$/a is 0.6, R$_1$ and R$_2$ are equal to 20 cm and z$_1$ and z$_2$ are equal to 4.7 cm. Equation (1) is therefore satisfied. A TEM$_{00}$ electric field intensity distribution characterised by this waist size and leaving the guide 12 for either of the mirrors 14 and 16 is returned to the guide substantially unchanged. This ignores imperfections of and edge effects at the relevant mirror, which are insignificant in practice for a mirror of adequate diameter. Moreover, the electric field distribution passing into the guide 12 at one of the apertures 20 and 22 is designed to be reproduced without significant change at the other aperture, and to pass to the other mirror for retroflection and return through the guide 12 as before.

Figure 2:
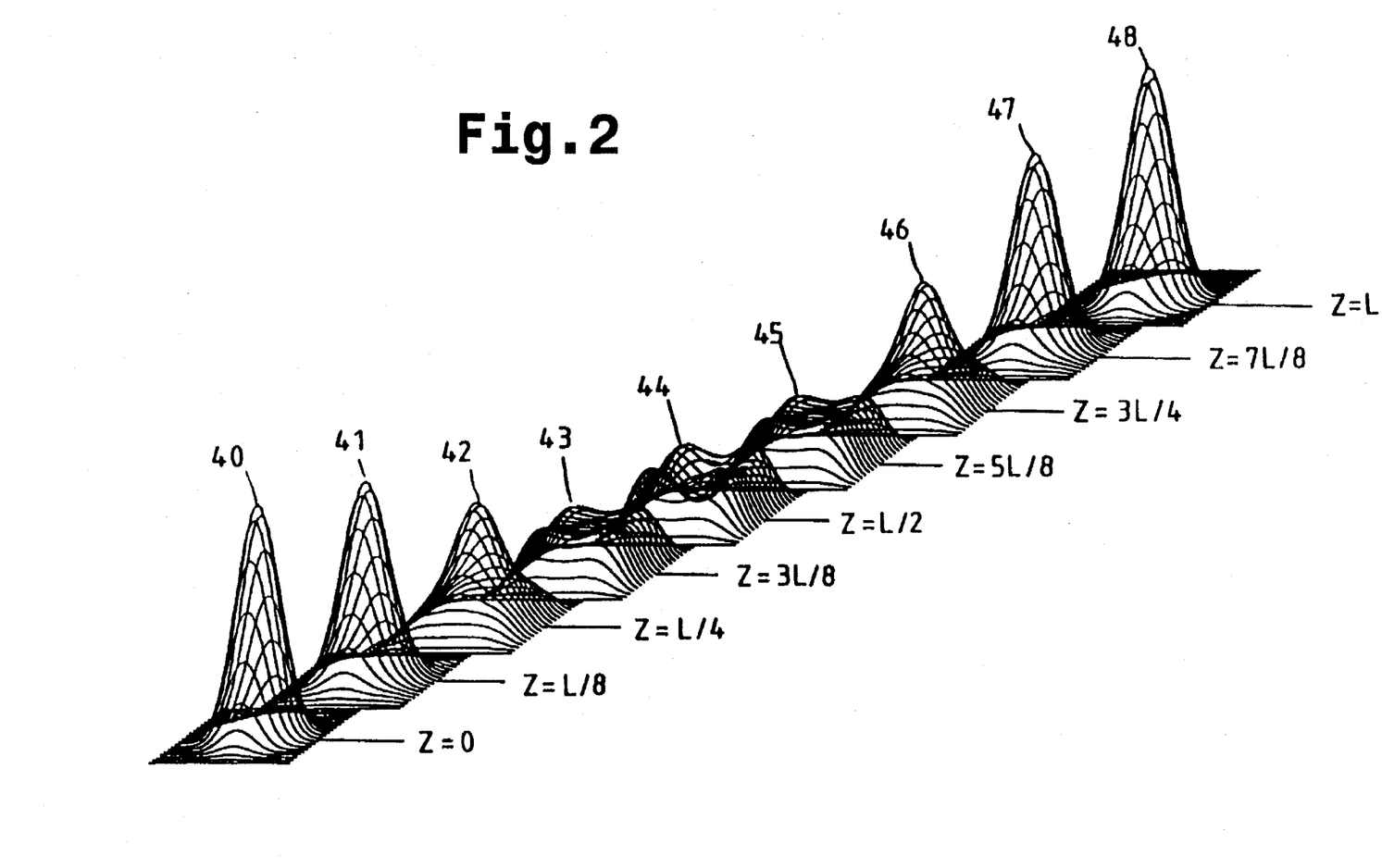
FIG. 2 illustrates electric field intensity distributions within the waveguide of the laser of FIG. 1.

Referring now also to FIG. 2, there are shown calculated plots of the transverse electric field intensity distribution due to radiation propagation in a single pass along the guide 12 at various points along the guide length L. In this drawing the longitudinal coordinate z is measured along the guide 12, and z values of 0 and L are at respective end aperture planes 24 and 28. The plots are referenced 40 to 48, and correspond to intervals of L/8 along the guide 12; ie plot N is the transverse electric field intensity distribution I(x,y) at a value of z of (N–40)L/8, where N is the plot reference number in the range 40 to 48.

Plot 40 shows the input excitation of TEM$_{00}$ form received at the first guide aperture 20 from the first mirror 14. This input excitation becomes decomposed into a linear combination of the modes of the guide 12. As has been said, only symmetric modes are excited. The modes propagate at different rates only the guide 12; ie model dispersion occurs. In consequence, at the mid-length of the guide 12 where z is L/2 the intensity distribution is a four-lobed pattern 44 arising from intermode interference due to phase differences having arisen between modes. At the far end of the guide 12 where z is L, the symmetric modes are in phase once more and give rise to a single lobed intensity distribution 48 equivalent to 40. The input intensity distribution 40 is therefore recreated as 48 at the second aperture 22.

In operation, radiation generated in a laser resonator arises from multiple transits of the resonator cavity. This establishes a self-consistent electric field which repeats itself in phase and amplitude after each round trip of the cavity. The laser 10 is designed for radiation to propagate from the second aperture 22 as a single-lobed quasi-TEM$_{00}$ beam to the second mirror 16, and is partially transmitted and partially reflected to provide the output beam 32. This beam therefore consists substantially of a single lobe with maximum intensity on the laser axis 18. The radiation reflected at the second mirror 16 retraces the path of the beam 30; it recreates the intensity distributions 48 to 40 in reverse order within the guide 12 before reaching the first mirror 14 and returning once more. It is an important advantage of the invention that the output beam 32 arises from a quasi-TEM$_{00}$ mode, since this provides a single lobed radiation beam with maximum intensity on the device axis 18. Higher order resonator modes produce off-axis lobes which are less useful for most optical purposes and may be hazardous.

The field-reproducing properties of the square section guide 12 arise from the general propagation characteristics of a rectangular waveguide. This latter waveguide is taken to have height 2a and width 2b, and to be bounded by a homogeneous dielectric material with complex dielectric constant ε. It is also assumed that this dielectric material (which provides the waveguide walls) is highly reflecting and not significantly attenuating for required propagating modes. The waveguide has height, width and length dimensions which are parallel to the x, y and z axes respectively. It has normalised linearly polarized modes of the kind EH$_{mn}$. The electric field contribution E$_{mn}$(x,y,z) of the mnth mode EH$_{mn}$ at the point (x,y,z) has been calculated by Laakmann et al in Appl. Opt. Vol. 15, No 5, pages 1334–1340, May 1976 as follows:

$$E_{mn}(x,y,z) = \frac{1}{\sqrt{(ab)}} \left[ \begin{matrix} \cos \\ \sin \end{matrix} \left( \frac{m\pi x}{2a} \right) \right] \left[ \begin{matrix} \cos \\ \sin \end{matrix} \left( \frac{n\pi y}{2b} \right) \right] e^{i\gamma_{mn}^z} \quad (6)$$

where m is the mode number relating to the field dependency along the x axis, n is the mode number relating to the field dependence along the y axis, z is the distance along the z axis (equivalent to axis 18 in FIG. 1), $\gamma_{mn} = (\beta_{mn} + i\alpha_{mn})$, the propagation constant of the $mn^{th}$ mode, $\beta_{mn}$ and $\alpha_{mn}$ being the $mn^{th}$ mode's phase and attenuation coefficients, and "cos" above "sin" indicates the former applies to odd mode numbers (n or n as appropriate) and the latter to even mode numbers.

The phase coefficient $\beta_{mn}$ is given by:

$$\beta_{mn} = \frac{2\pi}{\lambda} \left[ 1 - \left\{ \left(\frac{\lambda m}{4a}\right)^2 + \left(\frac{\lambda n}{4b}\right)^2 \right\} \right]^{\frac{1}{2}} \quad (7.1)$$

If the negative term in parenthesis in Equation (7.1) is small compared with unity (paraxial radiation approximation), which is satisfied in practice for low order modes, then the binomial theorem may be used to rewrite Equation (7.1) as:

$$\beta_{mn} = \frac{2\pi}{\lambda} \left[ 1 - \frac{1}{2} \left\{ \left(\frac{\lambda m}{4a}\right)^2 + \left(\frac{\lambda n}{4b}\right)^2 \right\} \right] \quad (7.2)$$

where a, b, m and n are as previously defined, and $\lambda$ is the free space wavelength of the radiation propagating in the waveguide.

Equation (6) sets out the electric field contributions obtainable from all linearly polarized modes of a rectangular waveguide. It is calculated on the basis that the electric field contribution of each mode is zero at the side walls of the rectangular waveguide, ie at y=+b and −b where y=0 on the equivalent of the axis 18. This is satisfied at least approximately for a rectangular waveguide with reflecting side walls. Not all waveguide modes are necessarily excited by a given input. In the case of the device 10 of FIG. 1, the guide 12 is a special case of a rectangular guide, since it is of square section. It receives input of $TEM_{00}$ form from the apertures 20 and 22. This input excitation is coupled to the various $EH_{mn}$ modes of the guide 12. The input $TEM_{00}$ field distribution $E_G$ say consequently becomes decomposed into a linear combination of the $EH_{mn}$ modes with respective complex multiplicative coefficients $A_{mn}$. This is expressed by:

$$E_G = \Sigma A_{mn} \cdot EH_{mn} \quad (8)$$

Essentially the $A_{mn}$ amplitude coupling coefficients are the coefficients of a Fourier series with represents the electric field at either guide aperture 20 or 22. The $EH_{mn}$ modes are mutually orthogonal, and in consequence the coefficients $A_{mn}$ can be calculated from overlap integrals, which, for a rectangular waveguide, are of the form:

$$A_{mn} = \int_{-b}^{+b} \int_{-a}^{+a} E_G \cdot EH_{mn} \cdot dy \cdot dx \quad (9)$$

From Equations (7) to (9) it is possible to calculate how the amplitude coefficients of the excited guide modes vary as a function of $w_0/a$, the ratio of the beam waist to the aperture size.

Equation (7.2) may be employed to demonstrate modal dispersion within a rectangular waveguide, and the consequent field reproduction phenomenon produced thereby. Putting m=1 and n=p in Equation (7.2) gives the phase coefficient $\beta_{1p}$ of guide mode $EH_{1p}$:

$$\beta_{1p} = \frac{2\pi}{\lambda} \left[ 1 - \frac{1}{2} \left\{ \left(\frac{\lambda}{4a}\right)^2 + \left(\frac{\lambda p}{4b}\right)^2 \right\} \right] \quad (10)$$

and the phase coefficient $\beta_{1q}$ of guide mode $EH_{1q}$ is given by:

$$\beta_{1q} = \frac{2\pi}{\lambda} \left[ 1 - \frac{1}{2} \left\{ \left(\frac{\lambda}{4a}\right)^2 + \left(\frac{\lambda q}{4b}\right)^2 \right\} \right] \quad (11)$$

By subtraction of Equation (11) from Equation (10) and rearranging, the phase difference between modes $EH_{1p}$ and $EH_{1q}$ at guide z is $X_z$ given by:

$$\chi z' = \beta_{1p} - \beta_{1q} = \frac{\pi \cdot \lambda \cdot z}{16 \cdot b^2} \cdot (p^2 - q^2) \quad (12)$$

If the condition is imposed that a $2\pi$ phase difference is required to exist between the modes, Equation (12) becomes:

$$\chi z = \frac{\pi \cdot \lambda \cdot z}{16 \cdot b^2} \cdot (p^2 - q^2) = 2\pi \quad (13)$$

and the propagation distance z (say $z_{2\pi}$) in Equation (13) in rectangular waveguide that gives rise to a $2\pi$ phase difference between modes $EH_{1p}$ and $EH_{1q}$ is given by:

$$z_{2\pi} = \frac{32 \cdot b^2}{(p^2 - q^2) \cdot \lambda} \quad (14)$$

For the case of the $EH_{11}$ and $EH_{1n}$ modes (ie the fundamental and $n^{th}$ order odd mode) $z_{2\pi}$ is given by:

$$z_{2\pi} = \frac{32 \cdot b^2}{(n^2 - 1) \cdot \lambda} \quad (15)$$

Combining Equations (2) and (13):

$$z_{2\pi} = \frac{8L'}{(n^2 - 1)}, \text{ where } L' = 4b^2/\lambda \quad (16)$$

With n=3, 5, 7, 9, 11 ..., $z_{2\pi}$ is L', L'/3, L'/6, L'/10, L'/15 .... This shows that there is a harmonic relationship between $EH_{1n}$ modes of a rectangular guide. Equation (16) shows that the propagation distance $z_{2\pi}$ which gives rise to a $2\pi$ phase shift between the fundamental $EH_{11}$ mode and the next highest order $EH_{13}$ mode also gives rise to a $2\pi$ phase shift between the fundamental and all other $EH_{1n}$ modes (n odd). This results in reproduction of any symmetric input electric field after a distance $z_{2\pi}$, provided that there is no excitation of even numbered $EH_{1n}$ modes. If there is sufficient length of waveguide available, a symmetric input field will be reproduced periodically at distances of $tz_{2\pi}$, where "t" is an integer number.

It can be shown that similar remarks apply to modes in the orthogonal dimension (mode number m) of a rectangular waveguide; ie if only symmetric modes are excited for which m is an odd number, these modes will be in phase with one another once more ($2r\pi$ phase difference, r=0, 1, 2, ... ) at a length of waveguide $4a^2/\lambda$, where 2a is the waveguide cross-sectional extent (width or height) in the direction of modes number m. The guide 12 is of square section with side 2a (ie a=b) and length L equal to $4a^2/\lambda$. It receives a quasi-$TEM_{00}$ input at each aperture 20 or 22 from the respective mirror 14 or 16, and this input therefore excites only symmetric modes (m and n both odd). The symmetric modes which are in phase at one point in a waveguide are also in phase at positions distant by multiples of L from that point by virtue of Equation (16). In consequence, provided that departures from Equation 7.2 and differences in attenuation of different modes are not significant, an electric field distribution input to the guide 12 which is on axis and located at one of the apertures 20 and 22 will be reproduced at the other of these apertures, provided that only symmetric modes of the guide are excited.

Figure 3:
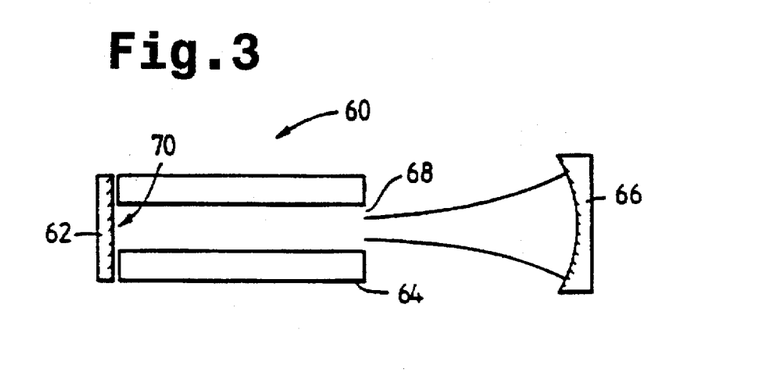
FIGS. 3 & 4 are schematic sectional side views of waveguide lasers of the invention each incorporating a plane resonator mirror and a concave resonator mirror.

Referring now to FIG. 3, there is shown a further embodiment of a waveguide laser of the invention indicated generally by 60. The laser 60 is equivalent to the FIG. 1 embodiment with one concave mirror 14 replaced by a plane mirror 62 placed very close to a guide 64. The guide 64 and a concave mirror 66 have identical dimensions and positioning relative to one another as the like for equivalent elements 12 and 16 in FIG. 1.

The plane mirror 62 is spaced less than 5 mm from the guide 64. It therefore falls within the class of Case I mirrors as previously defined. The concave mirror 66 is located in a position which corresponds (as in FIG. 1) neither to Case I, nor to Case II nor to Case III. It is a phase-matched mirror in the medium field.

The laser 60 operates equivalently to that described with reference to FIG. 1. A $TEM_{00}$ intensity distribution centred on a first guide end aperture 68 diffracts to the phase-matched concave mirror 66 and is returned to the first aperture 68. The guide 64 reproduces this electric field distribution at a second end aperture 70 adjacent the plane mirror 62, which is for practical purposes at zero separation from the guide. The electric field distribution at the second aperture 70 is accordingly recreated at the first aperture 68 and a further optical round trip commences.

Figure 4:
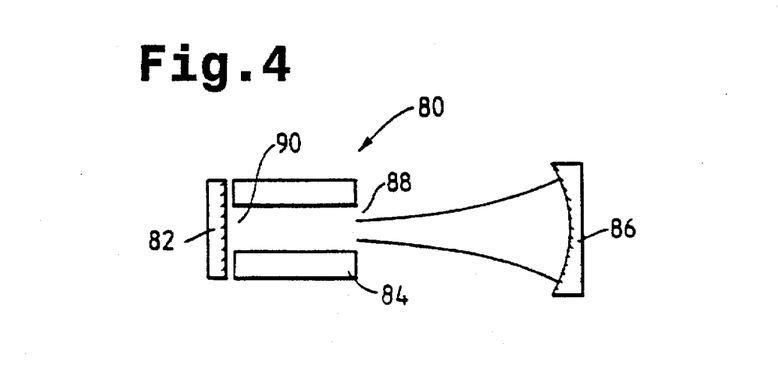

Referring now to FIG. 4, there is shown a further waveguide laser of the invention indicated generally by 80. This incorporates a fully reflecting plane mirror 82, a guide 84 and a partially reflecting concave mirror 86. The laser 80 is exactly as described with reference to FIG. 4, except that the guide 84 is $2a^2/\lambda$ in length, half that of the earlier equivalent guide 64. In view of the similarity of the lasers 60 and 80, only differences in operation will be discussed. The guide 84 is of length L/2, using the nomenclature of Equation (1) and FIG. 2. It therefore divides a quasi-$TEM_{00}$ intensity distribution at a first (right hand) end aperture 88 into a four-lobed intensity distribution at a second end aperture 90. The latter distribution is shown at 44 in FIG. 2. By virtue of retroreflection at the plane mirror 82, the four-lobed intensity distribution recreates a single-lobed quasi-$TEM_{00}$ intensity distribution at the first aperture 88. Retroflection at the plane mirror 82 doubles the effective length of the guide 84 so that a quasi-$TEM_{00}$ intensity distribution is recreated over a path length of L or $4a^2/\lambda$ within the guide. If the plane mirror 82 were to be partially reflecting, the laser 80 would provide a four-lobed output.

Figure 5:
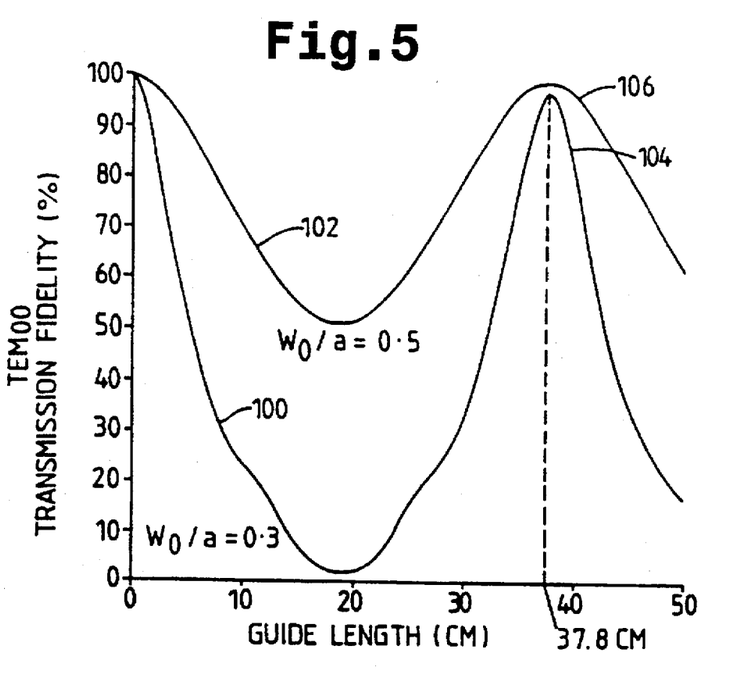
FIG. 5 graphically illustrates $TEM_{00}$ transmission fidelity within a waveguide as a function of waveguide length.

Referring now to FIG. 5, there are shown two graphs 100 and 102 obtained by calculation and indicating the transmission properties of guides such as 12, 64 and 84. The guide cross-section is square of side 2 mm, and the radiation wavelength is 10.59 microns as in the foregoing embodiments. $TEM_{00}$ transmission fidelity is plotted as a function of length of guide. The expression "transmission fidelity" is defined as the proportion of input intensity present in an output $TEM_{00}$ mode after transmission through a guide of length indicated by the relevant position on the horizontal axis. The input radiation is taken to have a beam waist $w_0$ at a guide input aperture, and the output radiation to have a like beam waist at a guide output aperture. Losses have been estimated based on alumina guide walls. The graphs 100 and 102 assume that the beam waist to guide aperture ratios $w_0/a$ are 0.3 and 0.5 respectively. The graphs 100 and 102 show over 95% transmission fidelity at respective peaks 104 and 106 centred at guide length 37.8 cm, which is $4a^2/\lambda$ or L for 2a=2 mm and $\lambda$=10.59. This demonstrates the accuracy of reproduction of a $TEM_{00}$ mode by a guide of length L.

Figure 6:
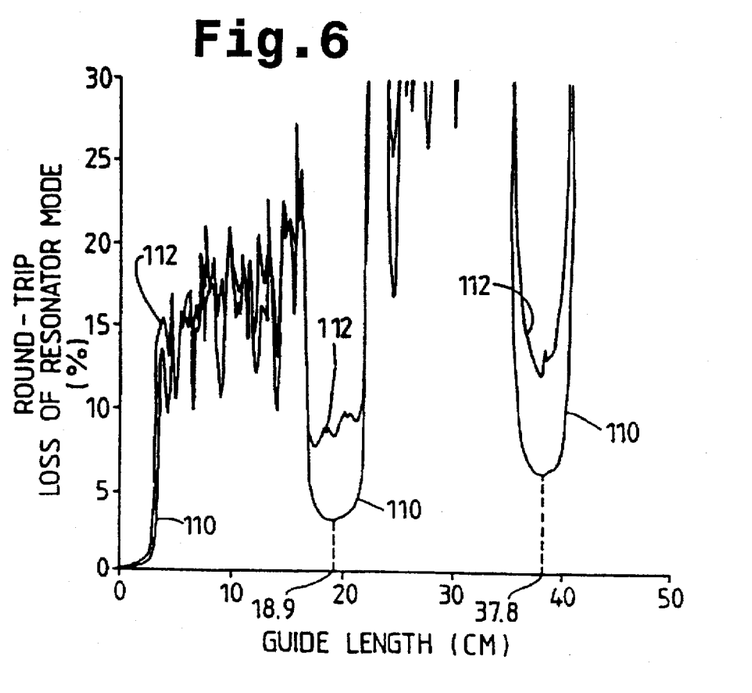
FIG. 6 graphically illustrates round-trip resonator loss as a function of waveguide length in a laser.

Referring now to FIG. 6, there is graphically illustrated the theoretically calculated loss as a function of guide length in a waveguide laser resonator experienced by laser radiation in a single round trip of the laser's internal optical path. In FIG. 1, the round trip is a double pass (forward and return) of the laser resonator between the cavity mirrors 14 and 16, and the trip is of length $2(z_1+z_2+L)$.

The round trip loss shown in graph 110 relates to the lowest order resonator mode. The round trip loss shown in graph 112 is that of the second order resonator mode.

The graph 110 shows that the round trip loss is low, less than 10%, for the lowest order resonator mode for wide ranges of values either side of guide lengths 10.9 cm and 37.8 cm respectively. These guide lengths are those of the guides 84 and 64 in FIGS. 4 and 3, and correspond to $2a^2/\lambda$ and $4a^2/\lambda$ respectively. Similar results are obtainable for guide lengths $2na^2/\lambda$, where n=3, 4 . . . . The graph 110 shows that, provided the guide length is a multiple of $2a^2/\lambda$, the round trip loss is insensitive to inaccuracies in guide length. Furthermore, since guide length is related to $a^2/\lambda$, minor inaccuracies in guide cross-section do not affect round trip loss. This is a major benefit of the invention, since it ensures that a waveguide laser of the invention having L equal to $2ma^2/\lambda$ (m=1, 2, 3, . . . ) will produce a substantially single-lobed, on-axis output despite inaccuracies of manufacture within reasonable tolerances. The relative insensitivity of the invention to guide cross-section errors is particularly important for guides in the region of 2 mm square, since it is very difficult to maintain accuracy of such a small cross-section over a guide length in the region of 20 or 20 cm. For example, a 5% inaccuracy in guide cross-section, ie a 100 μm width change, is equivalent to a 10% error (3.8 cm) in guide length by virtue of Equation (3).

The graphs 110 and 112 are well separated in the regions of guide lengths 18.9 cm and 37.8 cm, the round-trip loss difference being in the region of 5%. In consequence, for guide lengths within about ±10% of 18.9 cm and about ±5% of 37.8 cm, laser action will take place preferentially in the lower loss fundamental resonator mode to which graph 110 relates, and good mode discrimination is obtained. Similar remarks apply with reducing tolerances to guide lengths which are higher multiples of $2a^2/\lambda$.

Figure 7:
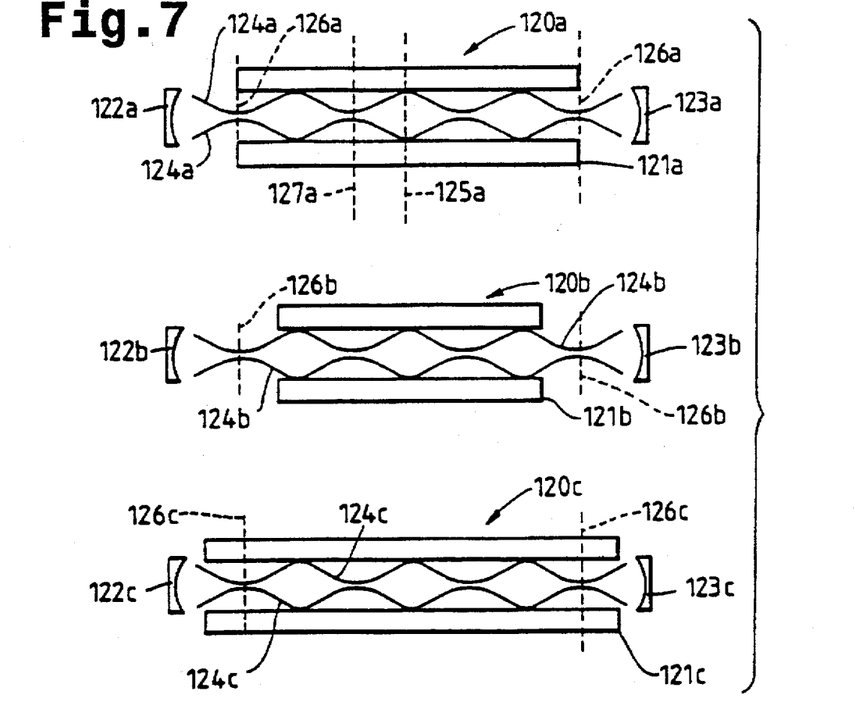
FIG. 7 schematically illustrates the effect of waveguide length change on laser beam waist position.

Referring now to FIG. 7, there is shown a schematic drawing of first, second and third waveguide lasers 120a, 120b and 120c (collectively referred to as 120) differing only in guide length. The lasers have respective guides 121a, 121b and 121c (collectively 121), and respective converging cavity mirrors 122a/123a, 122b/123b and 122c/123c. Lines 124a, 124b and 124c indicate outermost radiation intensity contours at which intensity is a fraction $1/e^2$ of maximum intensity. The guides 121 are of square internal cross-section of side 2a. The first guide 121a is of length $12a^2/\lambda$, and the second and third guides 121b and 121c are respectively shorter and longer than this. Longitudinal positions such as 125a of maximum separation of intensity contour lines are those at which there is division of intensity into a four-lobed pattern in a plane transverse to the length of a guide such as 121a. Longitudinal positions such as 126a and 127a at which line separation is a minimum are those at which a laser beam waist occurs; ie the transverse intensity pattern is single-lobed and on the waveguide axis.

Although it is a schematic drawing, and length differences between the guides 120 have been exaggerates for reasons of clarity, FIG. 7 indicates that guide length can vary without greatly affecting the radiation intensity distributions within the laser cavities defined by mirror pairs 122a/123a etc.

However, outermost beam waist positions 126b and 126c become outside and inside respective guides 121b and 121c as a result of change of guide length. This illustrates that inaccuracy in guide length shifts beam waist position from the design location in the plane of a guide aperture (eg aperture 20 or 22 in FIG. 1). It also alters the beam waist size somewhat. Because guide length is proportional to the square of the guide cross-sectional width by Equation (18), inaccuracy in guide cross-section has the same effect of shifting beam waist position. In consequence, it is only possible to define a design position and size for a beam waist, since manufacturing errors will change the beam waist position and size from their design values. Similar remarks apply to errors in mirror positions.

Figure 8:
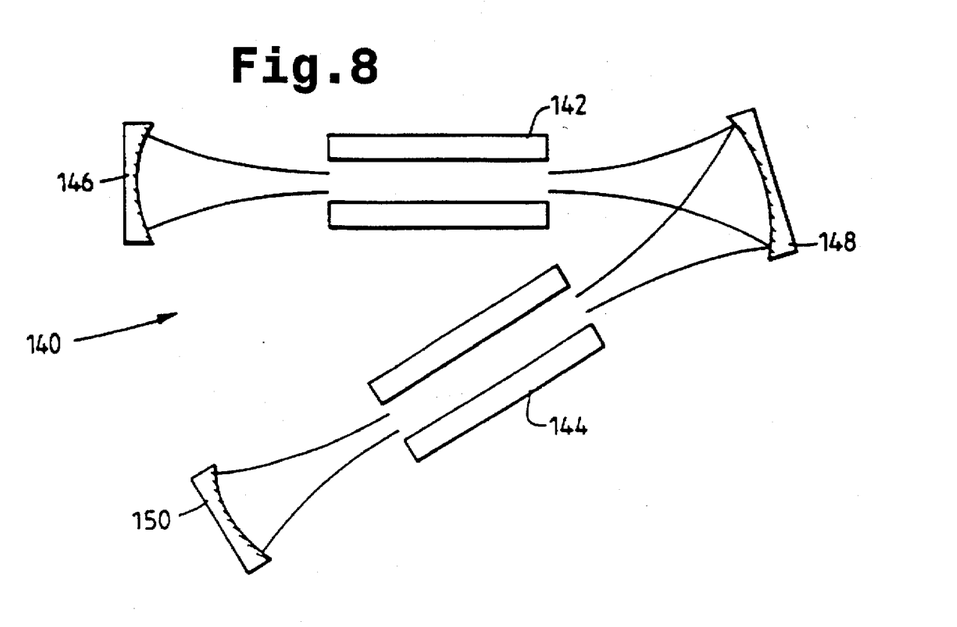
FIG. 8 is a schematic sectional side view of a laser of the invention incorporating two optically coupled waveguides.

Referring now to FIG. 8, there is shown a further embodiment of a waveguide laser of the invention indicated generally by 140. It incorporates first and second guides 142 and 144 together with first, second and third concave mirrors, 146, 148 and 150. The laser 140 is equivalent to two lasers 10 superimposed and coupled together, with a tilted second mirror 148 reflecting radiation from one guide 142 or 144 to the other 144 or 142. One of the mirrors 146, 148 and 150 is partially reflecting and the other two are fully reflecting. If one of the first and third mirrors is partially reflecting, a laser output beam emerges from it. If the second mirror 148 is partially reflecting, there are two mutually inclined output beams each coaxial with a respective guide and each phase-locked to the other beam.

Figure 9:
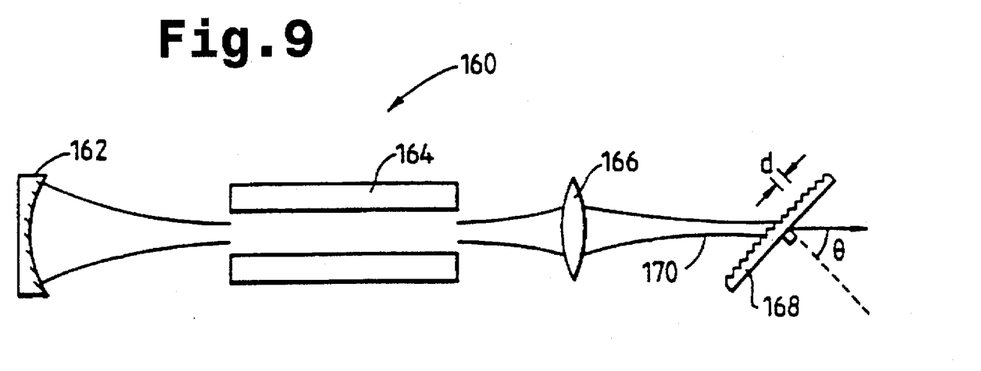
FIG. 9 is a schematic sectional side view of a laser of the invention incorporating a lens/grating combination.

FIG. 9 shows a further embodiment of the invention indicated generally by 160. It incorporates a concave mirror 162, a guide 164, a lens 166 and a diffraction grating 168 inclined at the Littrow angle θ to a laser beam 170. θ is given by:

$$\theta = \sin^{-1}(\lambda/2d) \quad (17)$$

where λ is the laser wavelength and d is the grating line spacing.

The combination of the lens 166 and grating 168 acts as a substantially phase matched, retroreflecting mirror equivalent to the mirror 16 in FIG. 1. Phase matching is not exact for reasons previously given and because of the grating inclination to the beam 170. Lens-grating combinations equivalent to mirrors are well-known in the art of leasers and will not be described further.

Figure 10:
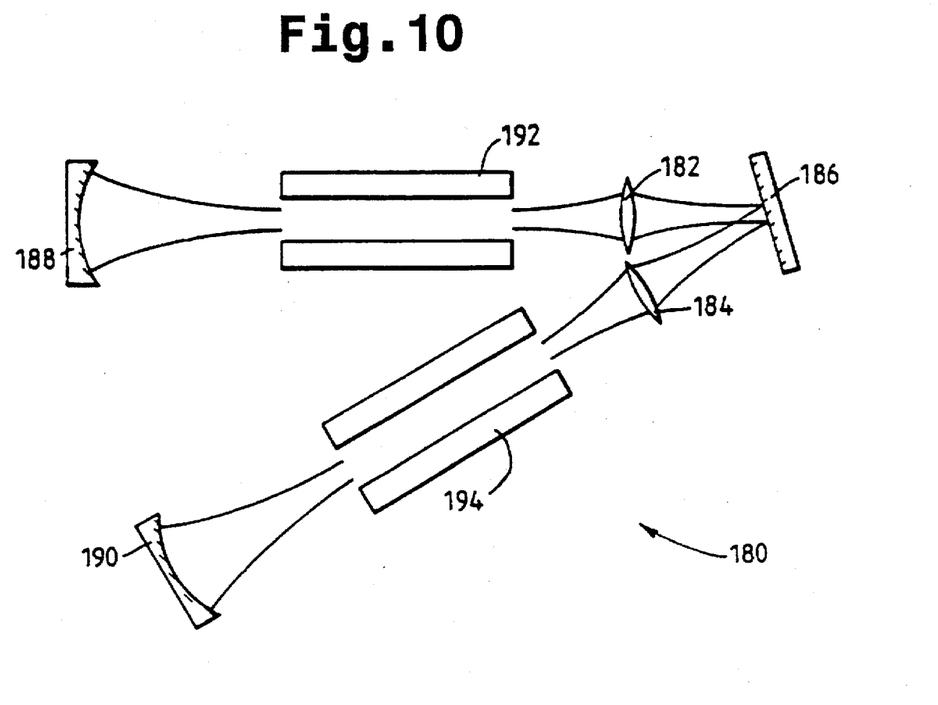
FIG. 10 is a schematic sectional side view of a laser of the invention incorporating two waveguides optically coupled by two lenses and a plane mirror.

FIG. 10 shows an embodiment of the invention indicated generally by 180 and equivalent to that described with reference to FIG. 8. The difference between these embodiments is that the tilted second mirror 148 in the latter has been replaced by two lenses 182, 184 and a tilted plane mirror 186 in the former. The embodiment shown in FIG. 10 has first and second concave mirrors 188 and 190 and first and second waveguides 192 and 194 identical to equivalents shown in FIG. 8. This is an example of a lens and plane mirror combination being equivalent to a concave mirror. A further alternative is a combination of a lens and curved mirror.

The guides 12, 64, 84, 142, 144, 164, 192 and 194 all have square cross-sections. It is also possible to employ a rectangular cross-section guide having sides 2a by 2b (b>a). In this case, to obtain electric field preservation, the relationship between guide length L, guide width and wavelength λ within the guide is to be satisfied for both parameters b and a simultaneously. In consequence, for a rectangular section guide of internal dimensions 2a×2b×L:

$$L = 4mb^2/\lambda = 4na^2/\lambda \quad (18)$$

$$\therefore b/a = \sqrt{(n/m)} = \sqrt{n} \text{ for } m=1 \quad (19)$$

Equation 19 shows that a rectangular guide obeying Equation 18 will be electric field preserving if its transverse dimensions 2b and 2a have a ration which is the square root of an integer ratio. The laser beam waist radius $w_0$ for a laser employing such a waveguide is required to be in the range 0.1b to 0.65b in the width dimension of side 2b and 0.1a to 0.65a in the width dimension of side 2a.

In a laser analogous to the FIG. 4 device 80, equivalents of Equations (18) and (19) are as follows:

$$L = 2mb^2/\lambda = 2na^2/\lambda \quad (20)$$

and $$b/a = \sqrt{(n/m)} \text{ as before} \quad (21)$$

It is also possible to employ a one dimensional guide in a laser of the invention. Such a guide has two substantially planar walls which are substantially parallel to one another. The walls provide waveguiding with respect to one transverse dimension. There are no guide walls or waveguiding effects in the orthogonal transverse dimension; in this latter dimension, the laser acts as a conventional free space resonator having reflecting means and a gain medium but no guide. The magnitude of the laser beam waist ($2w_0$) should be construed as a minimum beam width, sine in this example the intensity distribution at the beam waist is not symmetric with respect to rotation about the laser optical axis.

As a further example, a laser of the invention may be configured in accordance with the invention in one transverse dimension but not in the other. In this example, the mirror and guide geometry in one transverse dimension is as in the preceding one dimensional case. In the other transverse dimension, the resonator geometry may be as in any prior art laser arrangement; eg it may include guide walls not positioned equivalently to those of the one dimensional case.

We claim:

1. A waveguide laser including a waveguide located in a laser resonator cavity defined by first and second reflecting means, and wherein:
   (a) the waveguide has at least one pair of substantially planar guide walls which are substantially parallel to one another, and separated from one another by a distance 2a;
   (b) the cavity is designed to produce a beam waist of magnitude of $2w_0$ located centrally of a waveguide end aperture, where $w_0$ is within a range of 0.1a and 0.65a;
   (c) the first reflecting means is located to receive radiation emergent from the waveguide through the end aperture, and has converging and reflecting properties which, at least in a dimension orthogonal to the guide walls, are arranged to be phase matched to radiation received from a $TEM_{00}$ amplitude distribution at the aperture and having said beam waist magnitude; and
   (d) the cavity is designed to be electric field preserving at the waveguide end aperture with a $TEM_{00}$ radiation amplitude distribution at this aperture and having said beam waist magnitude is designed to be recreated after radiation therefrom has passed through the waveguide to the second reflecting means and returned.

2. A laser according to claim 1 wherein $w_0$ is in a range 0.3a to 0.5a.

3. A laser according to claim 2 wherein the waveguide is a first waveguide and the laser includes a second waveguide within the cavity.

4. A laser according to claim 3 including means for coupling radiation from the first waveguide to the second waveguide which means defines mutually inclined optical paths in the first and second waveguides.

5. A laser according to claim 1 having a gain medium within the waveguide providing gain at an operating wavelength within the waveguide of $\lambda$, and wherein the waveguide is of square cross-section with side 2a and length $4na^2/\lambda$ where n is a positive integer, the end aperture is a first such aperture and the waveguide has a second end aperture at which the cavity is arranged to be electric field preserving.

6. A laser according to claim 1 having a gain medium within the waveguide providing gain at an operating wavelength within the waveguide of $\lambda$, and wherein the second reflecting means is a plane mirror immediately adjacent the waveguide, the waveguide is of square cross-section with side 2a and length $2a^2/\lambda$, the aperture is a first end aperture and the waveguide has a second end aperture arranged immediately adjacent the second reflecting means.

7. A laser according to claim 1 having an operating wavelength within the waveguide of $\lambda$, and wherein:
(a) the waveguide is a first waveguide,
(b) the aperture is one of two end apertures of the first waveguide,
(c) a second waveguide having two end apertures is arranged within the cavity,
(d) the laser includes means for coupling radiation between one end aperture of the first waveguide and one end aperture of the second waveguide, and
(e) both waveguides are of square cross-section with side 2a and length $4a^2/\lambda$.

8. A laser according to claim 7 wherein the means for coupling radiation defines mutually inclined optical paths in the first and second waveguides.

9. A laser according to claim 1 wherein at least one of the first and second reflecting means comprises a leans arranged in combination with either a mirror or a diffraction grating.

10. A waveguide laser including a waveguide located in a laser resonator cavity defined by first and second reflecting means, said waveguide including at least one waveguide end aperture, and wherein:
(a) the waveguide has at least one pair of substantially planar guide walls which are substantially parallel to one another, said guide walls having a separation distance equal to 2a, where "a" is equal to one half of said separation distance;
(b) the cavity comprises a means for producing a laser beam waist located centrally of said at least one waveguide end aperture, said beam waist having a magnitude of $2w_0$, where $w_0$ is equal to one half of said magnitude and is within a range of 0.1a and 0.65a;
(c) the first reflecting means is located to receive radiation emergent from the waveguide through said at least one waveguide end aperture, and is phase matched to radiation arising from laser action within the cavity, at least in a dimension orthogonal to the guide walls, and said laser radiation having a $TEM_{00}$ amplitude distribution at the aperture form and having said waist magnitude of $2w_0$; and
(d) the cavity and the waveguide in combination comprising a means for electric field preservation at said at least one waveguide end aperture wherein the laser produces a laser radiation having a $TEM_{00}$ amplitude distribution and having said beam waist magnitude of $2w_0$, and said amplitude distribution becomes recreated by radiation therefrom passing through the waveguide to the second reflecting means and returning.

11. A laser according to claim 10 wherein said parameter $w_0$ is within a range of 0.3a to 0.5a.

12. A laser according to claim 11 wherein the waveguide is a first waveguide and the laser includes a second waveguide within the cavity.

13. A laser according to claim 12 further including means for coupling radiation from the first waveguide to the second waveguide wherein said means for coupling defines mutually inclined optical paths in the first and second waveguides.

14. A laser according to claim 11 having a gain medium within the waveguide providing gain at an operating wavelength of $\lambda$ within the waveguide, and said waveguide is of square cross-section with 4 sides, each side having a width equal to 2a and a length equal to $4na^2/\lambda$ where n is a positive integer, the at least one end aperture is a first such aperture and the waveguide has a second end aperture, and the cavity and the waveguide in combination comprising a means for electric filed preservation at the second end aperture.

15. A laser according to claim 10 having a gain medium within the waveguide providing gain at an operating wavelength of $\lambda$ within the waveguide, and said waveguide is of square cross-section with 4 sides, each side having a width equal to 2a and a length equal to $4na^2/\lambda$ where n is a positive integer, the at least one end aperture is a first such aperture and the waveguide has a second end aperture, and the cavity and the waveguide in combination comprising a means for electric field preservation at the second end aperture.

16. A laser according to claim 10 having a gain medium within the waveguide providing gain at an operating wavelength of $\lambda$ within the waveguide, and wherein the second reflecting means is a plane mirror immediately adjacent the waveguide, the waveguide is of square cross-section with 4 sides, each side having a width equal to 2a and a length equal to $2a^2/\lambda$, the at least one aperture is a first end aperture and the waveguide has a second end aperture arranged immediately adjacent the second reflecting means.

17. A laser according to claim 10 having an operating wavelength of $\lambda$ within the waveguide, and wherein:
(a) the waveguide is a first waveguide,
(b) said at least one waveguide end aperture is one of two waveguide end apertures in the first waveguide,
(c) a second waveguide having two waveguide end apertures is arranged within the cavity,
(d) the laser includes means for coupling radiation between one waveguide end aperture of the first waveguide and one waveguide end aperture of the second waveguide, and
(e) both waveguides are of square cross-section with 4 sides, each side having a width of 2a and a length of $4a^2/\lambda$.

18. A laser according to claim 15 wherein the means for coupling radiation defines mutually inclined optical paths in the first and second waveguides.

19. A laser according to claim 10 wherein at least one of the first reflecting means and second reflecting means comprises a lens arranged in combination with one of a mirror and a diffraction grating.

* * * * *